(12) United States Patent
Mune et al.

(10) Patent No.: US 8,554,041 B2
(45) Date of Patent: Oct. 8, 2013

(54) OPTICAL WAVEGUIDE OPTICAL CONNECTOR USING SAME, AND MANUFACTURING METHOD THEREOF

(75) Inventors: Kazunori Mune, Ibaraki (JP); Junichi Fujisawa, Ibaraki (JP); Yuichi Tsujita, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 277 days.

(21) Appl. No.: 13/046,045

(22) Filed: Mar. 11, 2011

(65) Prior Publication Data
US 2011/0222818 A1 Sep. 15, 2011

Related U.S. Application Data

(60) Provisional application No. 61/315,591, filed on Mar. 19, 2010.

(30) Foreign Application Priority Data

Mar. 12, 2010 (JP) ................................. 2010-056590

(51) Int. Cl.
G02B 6/10 (2006.01)
(52) U.S. Cl.
USPC ............................................. 385/131; 385/72
(58) Field of Classification Search
USPC ................... 385/59, 60, 72, 129–132
See application file for complete search history.

(56) References Cited

U.S. PATENT DOCUMENTS

| | | | | |
|---|---|---|---|---|
| 5,414,786 A | * | 5/1995 | Ohta et al. | 385/63 |
| 7,164,814 B2 | * | 1/2007 | Ohtsu et al. | 385/14 |
| 7,295,743 B2 | * | 11/2007 | Yatsuda et al. | 385/129 |
| 7,989,150 B2 | | 8/2011 | Khan | |
| 2008/0305439 A1 | | 12/2008 | Khan | |

FOREIGN PATENT DOCUMENTS

| | | |
|---|---|---|
| JP | 2000-002820 A | 1/2000 |
| JP | 2006-039282 A | 2/2006 |
| JP | 2009-15307 A | 1/2009 |
| JP | 2009-282168 A | 12/2009 |

OTHER PUBLICATIONS

JPCA Standards, "Detail Specification for PMT Connector" JPCA-PE03-01-07S-(2006), Japan Electronics Packaging and Circuits Association, May 2006 (Heisei 18). Cited in specification.
Chinese Office Action dated May 14, 2013, issued in corresponding Chinese Patent Application No. 201110056278.7, w/ English translation.
Japanese Office Action dated Jul. 2, 2013, issued in corresponding Japanese Patent Application No. 2010-056590, w/ English translation.

* cited by examiner

*Primary Examiner* — Daniel Petkovsek
(74) *Attorney, Agent, or Firm* — Westerman, Hattori, Daniels & Adrian, LLP (57) ABSTRACT

Disclosed is inexpensive optical waveguide for an optical connector which is accurately positioned across the width of cores when inserted in and fixed in an optical waveguide fixing through hole of a ferrule to provide low optical coupling loss when connected, an optical connector using the same, and a method of manufacturing the same. An optical waveguide for an optical connector includes cores, an under cladding layer, and an over cladding layer. The strip-shaped optical waveguide has a longitudinal end portion configured to be fixed in a predetermined through hole provided in a ferrule of an optical connector. The cores are formed on the under cladding layer by a photolithographic method. The over cladding layer is formed with respect to the positions of the cores or positioning alignment marks by a photolithographic method. The over cladding layer covers the cores, and the under cladding layer including crosswise end surfaces thereof.

2 Claims, 4 Drawing Sheets

OPTICAL WAVEGUIDE OPTICAL CONNECTOR USING SAME, AND MANUFACTURING METHOD THEREOF

RELATED APPLICATIONS

This application claims the benefit of U.S. Provisional Application No. 61/315,591, filed Mar. 19, 2010, which is hereby incorporated by reference.

BACKGROUND OF THE INVENTION

1. Field of the Invention

The present invention relates to an optical waveguide for an optical connector, an optical connector using the same, and a method of manufacturing the optical waveguide for an optical connector.

2. Description of the Related Art

In recent years, increases in degree of integration and scale of electronic devices have caused heat generation from and power consumption of electrical interconnect lines used frequently for connection between boards in the devices and between chips on the boards to become problems. An optical interconnection technique has been developed which replaces these electrical interconnect lines with light-weight low-heat-generating flexible polymer optical waveguides.

For such optical interconnection, an optical connector for use in coupling between boards and the like includes a strip-shaped optical waveguide, and a connecting terminal of a predetermined shape known as a ferrule mounted to a longitudinal end portion of the optical waveguide. This optical connector uses a positioning function achieved by the engagement between ferrules placed in opposed relation to provide coupling (optical connection) between an optical fiber and an optical waveguide or between optical waveguides (i.e., between optical connectors), thereby transmitting signals and the like between boards (see, for example, JPCA Standards, "Detail Specification for PMT Connector" JPCA-PE03-01-07S-(2006), Japan Electronics Packaging and Circuits Association, May 2006 (Heisei 18)).

In such an optical connector, an end surface (a connecting end surface) at the distal end of the ferrule at which the longitudinal end surface of the optical waveguide is uncovered is provided with guide holes and the like for insertion of alignment guide pins therein. The connection between optical connectors by the use of ferrules is made in a manner to be described below. Opposite ends of the above-mentioned guide pins are inserted into the guide holes of the ferrules placed so that the above-mentioned connecting end surfaces of the respective ferrules are in face-to-face (or opposed) relation to each other, and the above-mentioned connecting end surfaces are connected in face-to-face abutting relation to each other. This causes the longitudinal end surfaces of the optical fiber and the optical waveguide which are fixed in predetermined positions of the respective ferrules or the longitudinal end surfaces of the respective optical waveguides to abut against each other, thereby establishing an optical connection therebetween.

A typical example of the optical waveguide for use in an optical connector as described above is a strip-shaped optical waveguide having a width of several millimeters and a length in the range of several to tens of centimeters, and including, for example, eight, 12 or 24 cores across the width thereof. Such a strip-shaped optical waveguide having a narrow width is isolated and formed to a predetermined size by cutting a wider elongated film-shaped optical waveguide to a predetermined length, and then cutting the same to a predetermined width along the optical axis of each of the above-mentioned cores by dicing or using a laser beam and the like. The isolated strip-shaped optical waveguide of the predetermined size is inserted into a first insertion opening of an optical waveguide fixing through hole of the above-mentioned ferrule, and is fixed, with a first longitudinal end surface (an optical connection surface) of the strip-shaped optical waveguide revealed from a second exit opening of the through hole provided in the connecting end surface (front surface) of the ferrule having the above-mentioned guide holes (see Japanese Published Patent Application No. 2000-2820 and Japanese Published Patent Application No. 2006-39282).

However, the optical waveguides for an optical connector isolated using dicing as mentioned above have the disadvantage of being low in dimensional accuracy and, in particular, being large in variations in dimensional accuracy across the width of the optical waveguides because of the limited performance of cutting using dicing. Such large variations in size across the width of the optical waveguides cause the optical axes of respective cores in optical waveguides in abutting relation not to coincide with each other, thereby resulting in increased optical coupling losses, even when the optical waveguides are fitted into and fixed in respective optical waveguide fixing through holes formed in a predetermined position of ferrules and the optical connectors are connected in face-to-face abutting relation to each other while being aligned using the guide pins and the like.

The optical waveguides for an optical connector isolated using a laser beam have improved dimensional accuracy across the width thereof as compared with those isolated using the above-mentioned dicing, but cause the decrease in performance of the optical waveguides because of heating by the laser beam. Unlike the dicing, the use of the laser beam has the advantage of being able to isolate an optical waveguide in a curved fashion, but has the disadvantage of requiring an additional step for cleaning for the purpose of removing residues left after machining.

In view of the foregoing, an inexpensive optical waveguide for an optical connector is provided which is accurately positioned across the width of cores when inserted in and fixed in an optical waveguide fixing through hole of a ferrule to provide low optical coupling loss when connected, an optical connector using the same, and a method of manufacturing an optical waveguide for an optical connector.

SUMMARY OF THE INVENTION

A first aspect is intended for an optical waveguide for an optical connector, the optical waveguide comprising: cores for transmitting light; an under cladding layer provided under the cores; and an over cladding layer provided over the cores, the optical waveguide having a longitudinal end portion configured to be inserted and fixed in a predetermined through hole provided in a ferrule for connection to another optical connector, said under cladding layer having a width less than the width of said through hole, each of said cores being in the form of a ridge continuing in the longitudinal direction and including a photolithographic member made of a photosensitive resin, said over cladding layer including a photolithographic member made of a photosensitive resin and provided with respect to the positions of said cores or positioning alignment marks, said over cladding layer covering said cores and said under cladding layer including widthwise end surfaces thereof.

A second aspect is intended for an optical connector using said optical waveguide for an optical connector, wherein at least one end portion of the optical waveguide for an optical connector is inserted and fixed in a first insertion opening of a through hole provided in a ferrule having an alignment structure; a longitudinal distal end surface of the at least one end portion of the optical waveguide is revealed from a second exit opening of said through hole; and a longitudinal end portion of each core for transmitting light is positioned in place.

A third aspect is intended for a method of manufacturing said optical waveguide for an optical connector, said method comprising the steps of: forming the under cladding layer having a pattern narrower than the width of said through hole; forming a first photosensitive resin layer for the formation of the cores on a surface of the under cladding layer; irradiating the first photosensitive resin layer with irradiation light to expose the first photosensitive resin layer in a predetermined pattern to the irradiation light, thereby forming exposed portions of the first photosensitive resin layer into the cores; forming a second photosensitive resin layer for the formation of the over cladding layer covering the cores and said under cladding layer including widthwise end surfaces thereof; and aligning a photomask having a width equal to that of said through hole with respect to the positions of said cores or positioning alignment marks, and irradiating said second photosensitive resin layer with irradiation light to expose said second photosensitive resin layer in a predetermined pattern to the irradiation light, thereby forming the over cladding layer having a width approximately equal to that of said through hole.

Specifically, the present inventors have diligently made studies and have found that a physical (mechanical) cutting process using dicing, laser, and the like reduces the widthwise dimensional accuracy of the optical waveguide and the performance of the optical waveguide, and that the horizontal misalignment of the individual cores resulting from this reduction in accuracy causes the increase in optical coupling loss between ferrules. Thus, an optical technique such as photolithography is used, which is capable of machining to size with much higher precision as compared with the above-mentioned physical cutting process, for the formation of the optical waveguide to a predetermined width and configuration.

The optical waveguide for an optical connector is configured such that the over cladding layer is formed so as to cover the cores and the under cladding layer including the widthwise end surfaces thereof. Thus, the widthwise end surfaces of the over cladding layer form the whole width of the optical waveguide. The over cladding layer is highly precise because the over cladding layer is formed by a photolithographic method. Additionally, the over cladding layer is formed with respect to the positions of the above-mentioned cores or the positioning alignment marks. For this reason, when fitted in the through hole of a ferrule, the cores are accurately positioned in desired place as originally designed. Thus, when ferrules are connected to each other, the optical axes of the respective cores in the optical waveguide and the optical axes of respective cores of an optical fiber coincide with each other, or the optical axes of the respective cores in the optical waveguide coincide with each other. This prevents the increase in optical coupling loss.

In the optical connector using the above-mentioned optical waveguide for an optical connector, the at least one end portion of the optical waveguide for an optical connector is inserted and fixed in the first insertion opening of the through hole provided in the ferrule having the alignment structure; the longitudinal distal end surface of the at least one end portion of the optical waveguide is revealed from the second exit opening of the through hole; and the longitudinal end portion of each core for transmitting light is positioned in place. Such an optical connector is high in reproducibility of the core position of the optical waveguide fixed to the ferrule, and causes small product-to-product variations. Thus, when optical connectors (ferrules) are connected in face-to-face relation to each other while being aligned using guide pins and the like, the optical axes of the respective cores in the optical waveguides and the optical axes of respective cores of an optical fiber in abutting relation coincide with each other, or the optical axes of the respective cores in the optical waveguide coincide with each other. This maintains the optical coupling loss at an extremely low level.

In the method of manufacturing an optical waveguide for an optical connector, the over cladding layer is formed so as to cover the cores and the under cladding layer including the widthwise end surfaces thereof, and this over cladding layer is formed by a photolithographic method. Therefore, the widthwise end portions of the over cladding layer, i.e. the whole width of the optical waveguide, are formed with stable high precision.

Also in this manufacturing method, the over cladding layer is formed with respect to the positions of the cores or the positioning alignment marks. This creates no clearance when the over cladding layer is fitted into the optical waveguide fixing through hole of the ferrule to achieve the positioning of the cores in desired place as originally designed with high reproducibility. This reduces the optical coupling loss when optical connectors (ferrules) are connected in face-to-face relation to each other.

BRIEF DESCRIPTION OF DRAWINGS

FIGS. 5A1 to 5A6 are top plan views of an optical waveguide for an optical connector for illustrating a method of manufacturing the optical waveguide.

FIGS. 5B1 to 5B6 are longitudinal sectional views of the optical waveguide of FIGS. 5A1 to 5A6 for illustrating the method.

FIGS. 5C1 to 5C6 are end views of the optical waveguide of FIGS. 5A1 to 5A6 for illustrating the method.

DETAILED DESCRIPTION

Next, an embodiment will now be described in detail with reference to the drawings.

Figure 1:
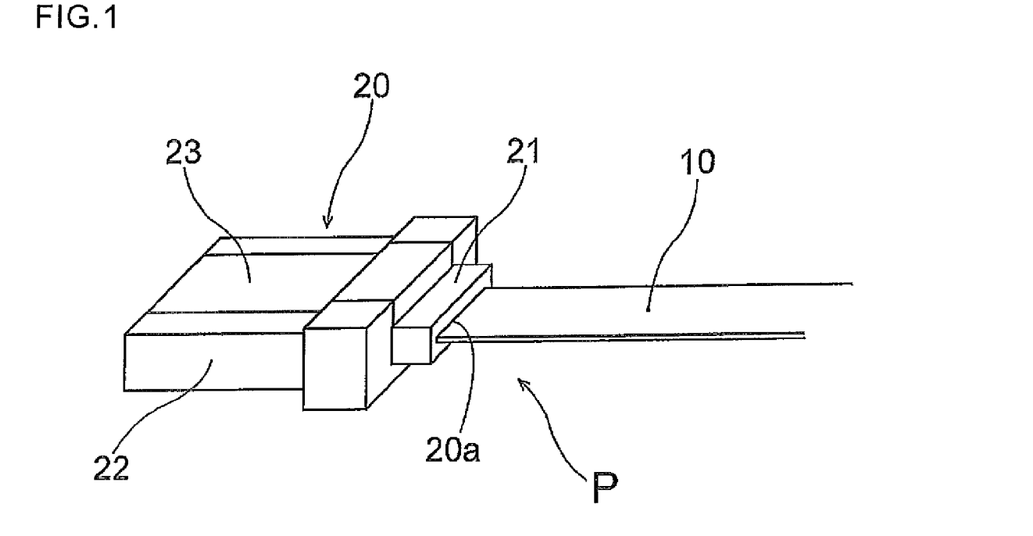
FIG. 1 is a schematic view of an optical connector.
Figure 2:
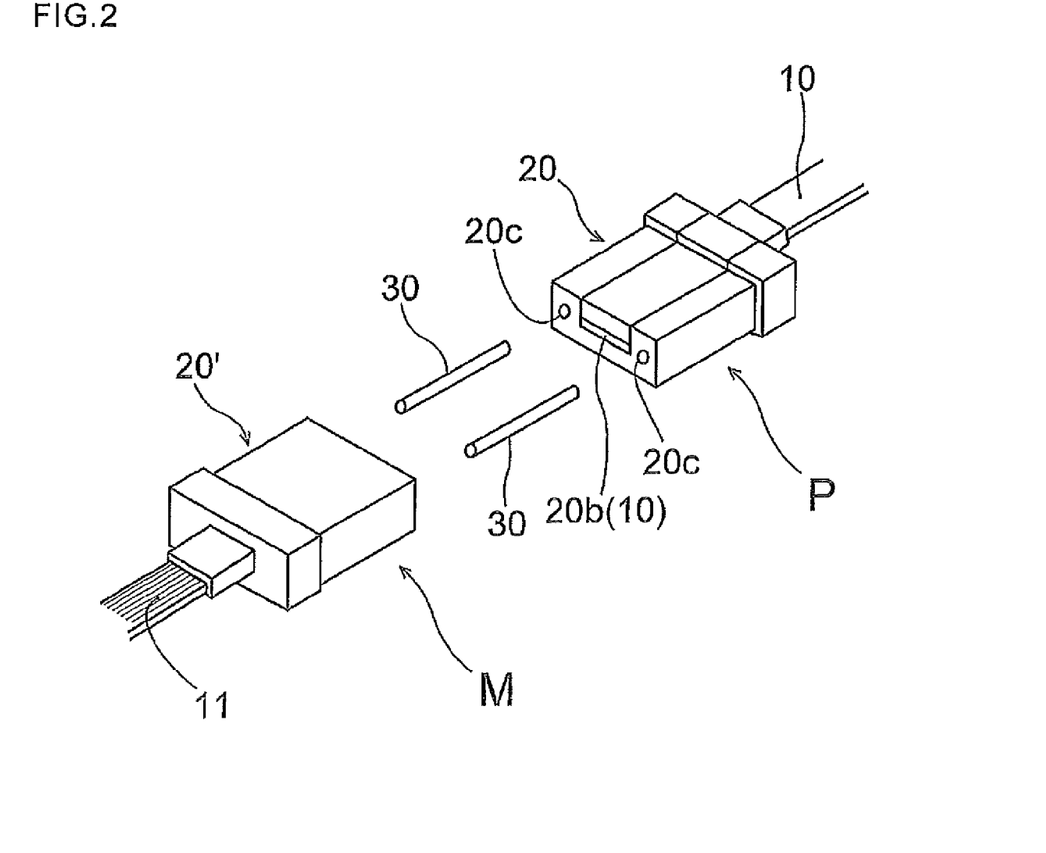
FIG. 2 is a view illustrating a method of connecting optical connectors to each other.
Figure 3:
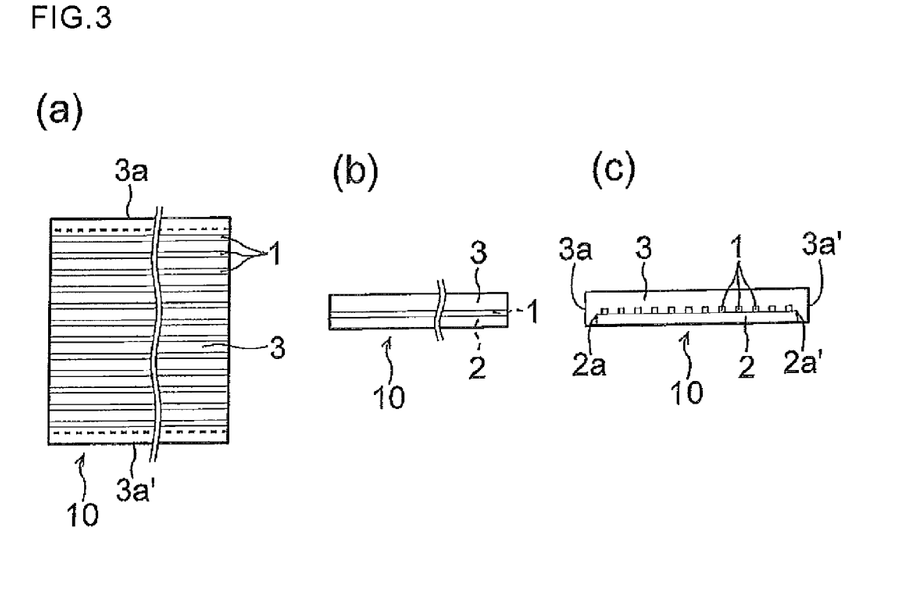
FIG. 3A is a schematic top plan view of an optical waveguide for an optical connector.
FIG. 3B is a schematic side view of the optical waveguide of FIG. 3A.
FIG. 3C is a schematic end view of the optical waveguide of FIG. 3A.

FIG. 1 is a schematic view of an optical connector according to the embodiment. FIG. 2 is a view illustrating a method of connecting optical connectors to each other. FIGS. 3A to 3C are schematic views showing the construction of an optical waveguide for use in the optical connector of the embodiment. FIG. 3A is a top plan view of the optical waveguide. FIG. 3B is a longitudinal side view of the optical waveguide. FIG. 3C is an end view of a longitudinal end portion of the optical waveguide. In the plan view of FIG. 3A and the side view of FIG. 3B, optical waveguide cores are in fact covered with an over cladding layer and cannot be seen, but are indicated by solid lines for ease of description. The direction of the long side of a strip-shaped optical waveguide 10 is referred to hereinafter as a longitudinal direction, and the direction of the short side of the above-mentioned optical waveguide 10 in which cores 1 are arranged is referred to as a crosswise direction. The direction in which layers constituting the optical waveguide 10 are stacked (thickness direction) is referred to as a vertical direction.

The optical connector according to the present embodiment is configured such that a connecting terminal [(PTM) ferrule 20] of a predetermined shape standardized by Japan Electronics Packaging and Circuits Association (JPCA) mentioned earlier is mounted, as shown in FIG. 1, to a longitudinal end portion of the strip-shaped optical waveguide 10 having a plurality of (in the present embodiment, 12) straight cores 1 arranged in the crosswise direction shown in FIG. 3A. In FIGS. 1 and 2, the reference numeral 21 designates a tubular boot constituting an insertion opening of the optical waveguide 10, 22 designates a ferrule body, 23 designates a cover, 30 designates alignment guide pins for connecting ferrules 20 in face-to-face relation to each other, and the reference character 20c designates guide holes for insertion of the respective guide pins 30 therein.

The above-mentioned ferrule 20 is formed by combining the above-mentioned boot 21 and the cover 23 with the ferrule body 22. A gap of a rectangular sectional configuration which constitutes a through hole for fixing an optical waveguide is formed between the ferrule body 22 and the cover 23. This gap is in communication with an interior space in the above-mentioned tubular boot 21. The boot 21 has an outside opening that defines an optical waveguide insertion opening 20a for the optical waveguide fixing through hole, and an opening at the above-mentioned gap (an end surface opening of the right-hand ferrule as seen in FIG. 2) that defines an optical waveguide exit opening 20b for the optical waveguide fixing through hole.

In this embodiment, the coupling end portion (the longitudinal end portion) of the strip-shaped optical waveguide 10 shown in FIG. 3C is inserted into the boot 21 for ferrule insertion, as shown in FIG. 1. Then, as in the right-hand ferrule 20 as seen in FIG. 2, the distal end (the optical connection surface) of the coupling end portion of the strip-shaped optical waveguide 10 is positioned in the optical waveguide exit opening 20b in the ferrule end surface, and is exposed to the outside. In this state, the above-mentioned strip-shaped optical waveguide 10 is fixed to the ferrule 20.

In this manner, the strip-shaped optical waveguide 10 together with the ferrule 20 constitutes an optical connector P. As shown in FIG. 2, using the guide pins 30, the above-mentioned ferrule 20 is coupled to a second ferrule 20' of generally the same shape in an optical connector M mounted to an end portion of an optical fiber 11 and the like. This optical connector P (in the present embodiment, a PMT optical connector using the optical waveguide 10) and the optical connector M (in the present embodiment, an MT optical connector using the optical fiber 11) are optically connected to each other.

In this case, the strip-shaped optical waveguide 10 is formed in such a manner that an over cladding layer 3 covers the cores 1 and also covers crosswise end surfaces 2a and 2a' of an under cladding layer 2, as shown in FIG. 3C. Thus, the crosswise end surfaces 3a and 3a' of the over cladding layer 3 form the whole width of the strip-shaped optical waveguide 10. The above-mentioned over cladding layer 3 is accurate and highly precise in size because the over cladding layer 3 includes a photolithographic member formed by a photolithographic method. Additionally, the over cladding layer 3 is formed by a manufacturing method to be described later with respect to the positions of the above-mentioned cores 1 or positioning alignment marks. This creates no clearance when the over cladding layer 3 is inserted into the rectangular through hole of the ferrule 20 to achieve the accurate positioning of the cores 1 in desired positions as originally designed. When the optical connector P is connected to the second optical connector M, the optical axes of the respective cores 1 in the above-mentioned strip-shaped optical waveguide 10 and the optical axes of respective optical fiber cores in the second ferrule 20' opposed thereto coincide with each other. This prevents the increase in optical coupling loss.

Next, an optical waveguide for use in the above-mentioned optical connector P will be described.

A polymer-based optical waveguide that is so flexible as to be bent and that is easily formed by photolithography is used as the strip-shaped optical waveguide 10 for use in an optical connector. This optical waveguide 10 is similar in fundamental construction to conventional film-shaped optical waveguides, and includes the plurality of cores 1 serving as a light passageway for transmitting light, the over cladding layer 3 formed over the cores 1, and the under cladding layer 2 formed under the cores 1, as shown in FIGS. 3A to 3C. This over cladding layer 3 is formed so as to cover the above-mentioned cores 1 and also to cover the crosswise end surfaces 2a and 2a' of the above-mentioned under cladding layer 2.

The under cladding layer 2 is a strip-shaped member of a rectangular sectional configuration. For the production of the optical waveguide in accordance with JPCA Standards described above, the under cladding layer 2 is required to have a width of 3.000 mm (with errors of +0.00 mm and −0.03 mm). In the optical waveguide for an optical connector according to the present embodiment, the width of the under cladding layer 2 is previously made slightly (10 to 30 μm on one side, and 20 to 60 μm in whole width) smaller than the above-mentioned required width in consideration of the process of covering the crosswise end surfaces 2a and 2a' of this under cladding layer 2 with the over cladding layer 3 to be described later.

The above-mentioned cores 1 include a photolithographic member made of a photosensitive resin and formed by a photolithographic method. Each of the cores 1 is in the form of a ridge of a substantially square sectional configuration continuing in the longitudinal direction of the optical waveguide. The cores 1 are parallel to each other in the longitudinal direction thereof. For the production of the optical waveguide in accordance with JPCA Standards described above, the cores 1 are 0.04 mm per side (with an error of ±0.005 mm), and are arranged at a spacing of 0.25 mm. These 12 cores 1 are produced at a time by a photolithographic method. The term "photolithographic member made of a photosensitive resin" refers to a member produced by the above-mentioned photolithographic method.

The thickness (height) and width of the above-mentioned cores 1, the spacing between the cores 1, and the number of cores maybe designed in accordance with an object to be connected. In the present embodiment, the cores 1 have a fixed width in the longitudinal direction. However, the cores 1 may have a greater width at first ends thereof, and a smaller width at second ends thereof for the purpose of improving optical coupling efficiency in the end portions (the light-emitting end portion and the light-receiving end portion) of the above-mentioned strip-shaped optical waveguide 10. When light is received from an optical fiber having a core width of 50 μm as an example, the cores may have a greater sectional configuration with a height (thickness) of 50 μm and a width of 60 µm in the light-receiving end portion of the optical waveguide for an optical connector, and have a smaller sectional configuration with a height of 50 µm and a width of 40 µm in the light-emitting end portion at the other end.

The over cladding layer 3 covering the above-mentioned cores 1 and the under cladding layer 2 includes a photolithographic member made of a photosensitive resin described earlier with respect to the positions of the above-mentioned cores 1 or the positioning alignment marks. More specifically, the photosensitive resin is applied so as to cover the cores 1 and the under cladding layer 2 and to thickly cover left-hand and right-hand side portions of the under cladding layer 2 along the length thereof. Then, a photomask covering only outside portions of the above-mentioned thick left-hand and right-hand side portions with a predetermined size is used to detect the positions of the left-hand and right-hand cores 1 along the width thereof or the positioning alignment marks by visual observation, with an optical microscope, with an optical sensor, by image processing using a camera, or the like. The above-mentioned photomask is positioned with respect to these positions, and exposure to light and development are performed. This provides the over cladding layer 3 covering the cores 1 and the under cladding layer 2 and also covering the left-hand and right-hand end portions (the end surfaces 2a and 2a') of the under cladding layer 2 along the width thereof with a predetermined width.

The above-mentioned over cladding layer 3 alone has a thickness of 0.03 to 0.13 mm, and is adapted so that the total thickness of the optical waveguide 10 as a whole is in the range of 0.1 to 0.2 mm. The entire width of the over cladding layer 3 is 3.000 mm (with errors of +0.00 mm and –0.03 mm).

Like the above-mentioned under cladding layer 2 and the cores 1, this over cladding layer 3 is also formed to have a length on the order of tens to hundreds of millimeters in compliance with the wishes of customers. However, the over cladding layer 3 may be made slightly longer so as to cover the longitudinal end surfaces of the under cladding layer 2 and the cores 1. Part of a length exceeding the above-mentioned wishes of customers is cut by dicing to be described later and the like. This causes the longitudinal end surface (an optical connection surface of a substantially square sectional configuration) of each of the cores 1 to be uncovered at the longitudinal end surface (the distal end surface, i.e. a contact surface with another optical connector) of the optical waveguide 10. This over cladding layer 3 is also a "photolithographic member made of a photosensitive resin" which is formed by the above-mentioned photolithographic method.

In this manner, the optical waveguide for an optical connector according to the present embodiment is accurate and highly precise in size because the over cladding layer 3 includes the photolithographic member formed by the photolithographic method. Additionally, the over cladding layer 3 is formed with respect to the positions of the above-mentioned cores 1 or the positioning alignment marks. Thus, when the over cladding layer 3 is inserted into the optical waveguide fixing hole of the ferrule 20 of the above-mentioned optical connector P, the accurate positioning of the cores 1 is achieved in desired position as originally designed.

Figure 4A:
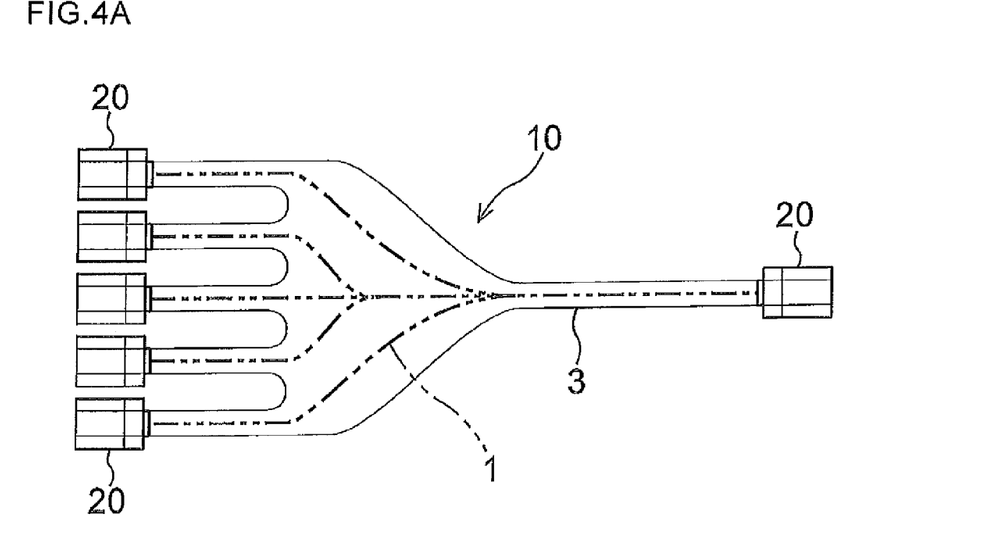
FIGS. 4A and 4B are views showing other exemplary forms of the optical connector.
Figure 4B:
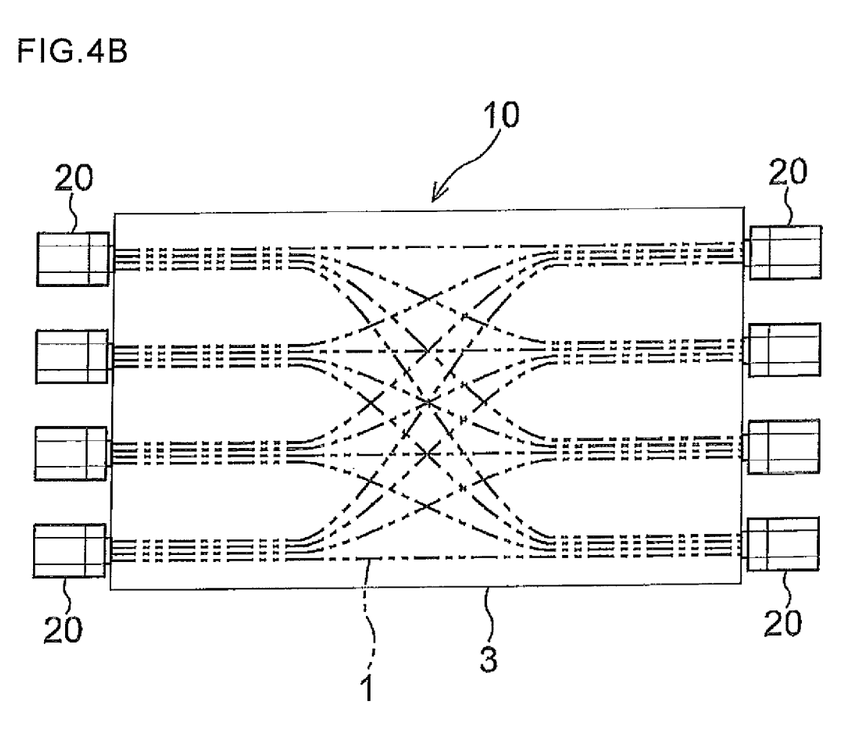

In the above-mentioned embodiment is illustrated the linear optical waveguide including the 12 cores (12 channels) which is adaptable to an MT ferrule or a PTM ferrule disclosed in JPCA Standards. However, the optical waveguide for an optical connector may be formed as an optical waveguide of other configurations. The optical waveguide is applicable, for example, to an optical waveguide including a curved core pattern, an optical waveguide including a core branching off for demultiplexing and multiplexing optical signals with reference to FIG. 4A, and an optical waveguide including cores intersecting each other for the recombination of optical signals with reference to FIG. 4B. For such core patterns, it is not necessary that a single ferrule is mounted to each end of the optical waveguide, but multiple ferrules may be mounted in accordance with desired functions.

Next, a method of manufacturing an optical waveguide for an optical connector will be described.

Figure 5A:
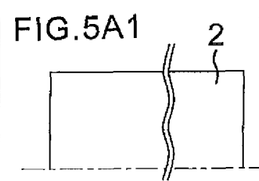
Figure 5A:
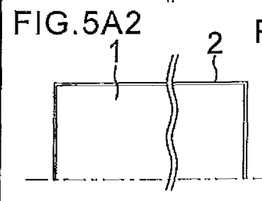

FIGS. 5A1 to 5A6, 5B1 to 5B6, and 5C1 to 5C6 are views for illustrating the method of manufacturing an optical waveguide for an optical connector according to the embodiment. FIGS. 5A1 to 5A6 are top plan views of the optical waveguide, FIGS. 5B1 to 5B6 are longitudinal sectional views of the optical waveguide, and FIGS. 5C1 to 5C6 are end views of a longitudinal end portion of the optical waveguide. The process steps proceed in the order indicated by the arrow to the left of the figures.

Figure 5A:
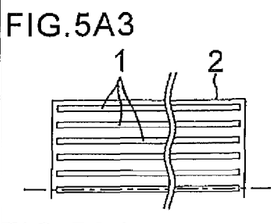
Figure 5A:
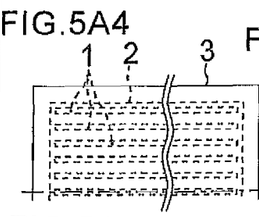
Figure 5A:
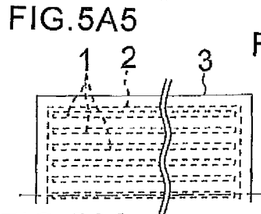
Figure 5A:
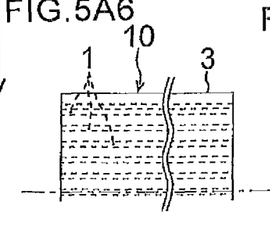
Figure 5B:
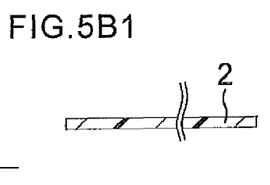
Figure 5B:
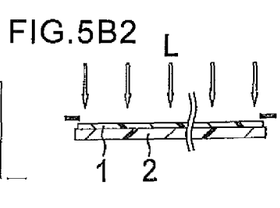
Figure 5B:
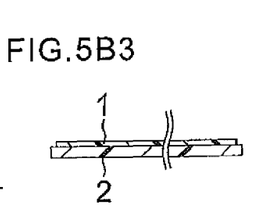
Figure 5B:
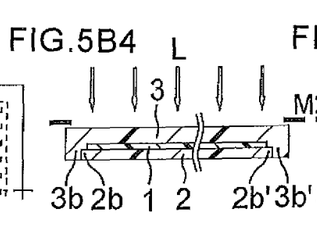
Figure 5B:
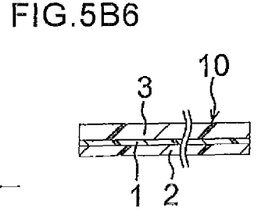
Figures 5B, 5C:
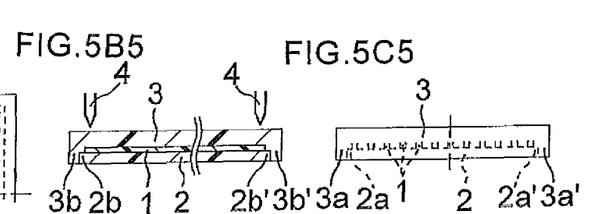
Figure 5C:
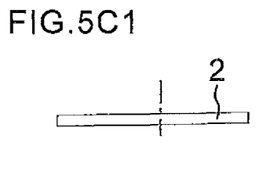
Figure 5C:
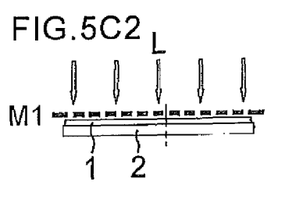

The method of manufacturing an optical waveguide for an optical connector according to the embodiment is as follows. First, the under cladding layer 2 of a predetermined width is formed on a substrate (not shown) such as a glass plate, a resin plate and a metal plate by coating and the like, as shown in FIGS. 5A1, 5B1 and 5C1.

This under cladding layer 2 is formed in a manner to be described below. Specifically, a varnish containing resin as a material is applied onto the substrate. The application of the varnish is achieved, for example, by a spin coating method, a dipping method, a die coating method, a roll coating method and the like. Then, the varnish is hardened to produce the under cladding layer 2.

Then, as shown in FIGS. 5A2, 5B2 and 5C2, a material (a photosensitive resin) for the formation of the cores 1 is applied onto the under cladding layer 2. Thereafter, using a photomask M1 indicated by broken lines, a photosensitive resin layer for the formation of the cores 1 is irradiated with ultraviolet light indicated by hollow arrows L. Thus, the photosensitive resin layer is exposed in a predetermined pattern to the ultraviolet light, and is then developed. This produces the straight cores 1 as shown in FIGS. 5A3, 5B3 and 5C3.

Figure 5C:
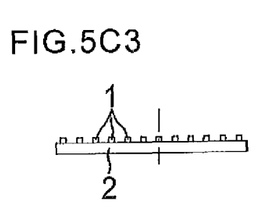

More specifically, the cores 1 are formed in a manner to be described below. First, a varnish prepared by dissolving a photosensitive resin in a solvent is applied onto the under cladding layer 2 in the above-mentioned manner by a spin coating method, a dipping method, a die coating method, a roll coating method and the like. Then, the varnish is dried to form a photosensitive resin layer. Then, the above-mentioned photosensitive resin layer is exposed to irradiation light L such as ultraviolet light, visible light and the like through the photomask M1 formed with an opening pattern corresponding to the desired pattern of the cores 1. After the step of dissolving and removing unexposed portions, the exposed portions become the cores 1.

After the above-mentioned exposure to light, a heating treatment is performed to complete the photoreaction, depending on the type of photosensitive resin. Thereafter, the development is performed using a developing solution by an immersion method, a spray method, a puddle method and the like to dissolve away the unexposed portions of the photosensitive resin layer, thereby forming the remaining photosensitive resin layer into the pattern of the cores 1. Then, the developing solution remaining in the remaining resin layer formed in the pattern of the cores 1 is removed by a heating treatment. This causes the remaining resin layer formed in the pattern of the cores 1 to be formed into the cores 1 with reference to FIGS. 5A3, 5B3 and 5C3.

Next, as shown in FIGS. 5A4, 5B4 and 5C4, a material (a photosensitive resin) for the formation of the over cladding layer 3 is applied or otherwise provided to cover the cores 1 and also to cover the crosswise end surfaces 2a and 2a' of the under cladding layer 2. Then, the positions of the cores 1 covered with the material for the formation of the above-mentioned over cladding layer 3 or the positions of the positioning alignment marks formed at the same time as the production of the above-mentioned cores 1 are detected by visual observation, with an optical microscope, with an optical sensor, by image processing using a camera, or the like. A photomask M2 is aligned with respect to the core positions. Thereafter, a photosensitive resin layer for the formation of the over cladding layer 3 is exposed to light and is then developed. This provides a strip-shaped optical waveguide as shown in FIGS. 5A5, 5B5 and 5C5.

Figure 5C:
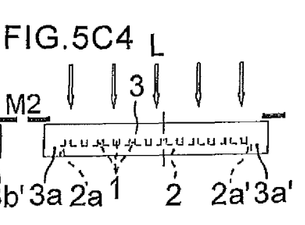
Figure 5C:
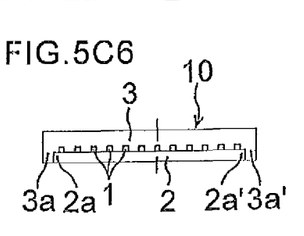

More specifically, a varnish containing the above-mentioned photosensitive resin is first applied onto the above-mentioned cores 1 and the under cladding layer 2. At this time, the varnish is applied so wide (wider than the whole width that is a final target) as to cover the crosswise end surfaces 2a and 2a' of the under cladding layer 2 as shown in FIG. 5C4, and also so long as to cover the longitudinal end surfaces 2b and 2b' of the under cladding layer 2 as shown in FIG. 5B4. The application of this varnish is achieved, for example, by a spin coating method, a dipping method, a die coating method, a roll coating method and the like. Then, the varnish is hardened.

For this hardening, the varnish is exposed to the irradiation light L through the photomask M2 formed with an opening pattern corresponding to the desired shape of the over cladding layer 3. At this time, prior to the positioning of the photomask M2, the positions of the cores 1 or the alignment marks which serve as the starting points of the positioning are previously measured using an optical microscope, an optical sensor and the like, and accurate position control is effected with respect to the measured positions so that the crosswise edge portions of the opening pattern of the photomask M2 are in positions where the whole width that is the above-mentioned final target is formed, as shown in FIG. 5C4.

The positioning method of the above-mentioned photomask M2 will be described in further detail. Examples of the positioning method to be used include (1) a positioning method with respect to the cores 1 themselves (the core pattern itself) formed on the under cladding layer 2, and (2) a positioning method with respect to the alignment marks formed on the under cladding layer 2 at the same time as the above-mentioned cores 1.

In general, materials used for an optical waveguide are transparent to visible light, and an image processing method for use in a conventional photolithographic process is applicable to the method of aligning the photomask M2. In the case of the above-mentioned method (1), for example, the material of the cores 1 has a refractive index generally at least 0.01 higher than that of the material of the under cladding layer 2 and the over cladding layer 3 at a wavelength being used. High-precision alignment is achieved by recognizing the core pattern using this difference in refractive index and by performing binarization using image processing and the like. Of course, the alignment may be performed with an optical microscope or by operator's visual observation.

When the substrate is transparent, the core pattern is accurately recognized by irradiating the back surface of the substrate with light so that the edges (outlines) of the above-mentioned core pattern are detected. When the substrate is not transparent, alignment may be performed by directing light from above the core pattern to cause the edges of the pattern to emerge and be recognized. For the positioning with respect to the core pattern, it is preferable to recognize terminal portions, rather than a central portion (a region other than the end portions), of the core pattern because this reduces the risk of misalignment. It is also preferable to use two of the cores 1 lying on crosswise opposite ends or one of the two cores 1 as a reference. Of course, all of the cores 1 may be used as a reference.

In the case of the positioning method (2) with respect to the positioning alignment marks previously formed on the under cladding layer 2 at the same time as the formation of the above-mentioned cores 1, the alignment marks are recognized by visual observation, with an optical microscope, by the above-mentioned image processing, or the like, whereby the alignment of the photomask M2 is performed. The alignment marks are formed on the above-mentioned photomask M1 for the exposure of the cores, separately from the core pattern. Because the alignment marks are formed by a photolithographic method at the same time as the cores 1 during the formation of the above-mentioned cores 1, the dimensional and positional accuracy of the alignment marks and the cores 1 relative to each other is typically as high as approximately 0.1 μm. Thus, when the above-mentioned photomask M2 is aligned with respect to the alignment marks, the positional accuracy is maintained as high as that obtained using the pattern of the above-mentioned cores themselves as a reference. When the alignment marks are used for the positioning of the photomask M2, it is preferable to place the alignment marks in a peripheral area of the above-mentioned photomask M1, rather than near the center of the photomask M1. Preferably, the shape of the above-mentioned alignment marks is a symmetrical shape, such as a cross mark and a circle, which is less influenced by orientation during the image recognition.

After the completion of the positioning of the photomask M2, exposure to the irradiation light L is performed through this photomask M2. After the step of dissolving and removing unexposed portions, the exposed portions become the over cladding layer 3. Preferably, ultraviolet light is used as the irradiation light. After the above-mentioned exposure to light, a heating treatment is performed to complete the photoreaction. Thereafter, development is performed using a developing solution to dissolve away the unexposed portions of the photosensitive resin layer. A heating treatment is performed to remove the developing solution, thereby forming the remaining resin layer into the over cladding layer 3 having a pattern of a desired width, as shown in FIGS. 5A5, 5B5 and 5C5. This method allows the optical waveguide to have an accurately desired whole width.

Then, as shown in FIGS. 5B5 and 5B6, dicing using cutting edges 4 is performed to cut off the longitudinal end portions of the optical waveguide, thereby providing a desired length of the strip-shaped optical waveguide. This manufactures the optical waveguide for an optical connector having a predetermined width and a predetermined length and configured such that the longitudinal end surfaces (square end surfaces) of the cores 1 are uncovered at the first longitudinal end surface (the optical connection surface) of the optical waveguide.

In this manner, in the method of manufacturing an optical waveguide for an optical connector according to the present embodiment, the over cladding layer 3 which is formed by a photolithographic method is highly precise. Also, the crosswise end surfaces of the over cladding layer 3 are formed with respect to the positions of the above-mentioned cores 1. Thus, when the optical waveguide is fitted in the through hole (the optical waveguide insertion opening 20a) of the ferrule (20) of the optical connector as shown in FIG. 1, no clearance is created because the width (whole width) of the optical waveguide for an optical connector and the width of the above-mentioned through hole coincide with each other, whereby accurate positioning of the cores 1 is achieved in desired positions as originally designed. When optical connectors are connected to each other, the optical axes of optical fiber cores and optical waveguide cores coincide with each other or the optical axes of the respective cores in the optical waveguides coincide with each other. This prevents the increase in optical coupling loss.

In the optical waveguide for an optical connector, it is preferable that, like the above-mentioned cores 1 and the over cladding layer 3, the under cladding layer 2 is also a "photolithographic member made of a photosensitive resin" which is formed by the above-mentioned photolithographic method. In this manner, the use of the photolithographic member for the under cladding layer 2 further improves the dimensional accuracy of the under cladding layer 2.

An ultra-high-pressure mercury-vapor lamp and a high-pressure mercury-vapor lamp are typically used for the irradiation with ultraviolet light through the photomask in the above-mentioned photolithographic method. Such light sources, however, contain multiple wavelengths such as G-line, H-line and I-line, rather than a single wavelength. On the other hand, some types of photosensitive resins are known to show improvements in resolution and in image formation when irradiated with light of a limited wavelength region, rather than broad-spectrum light containing these multiple wavelengths. In particular, epoxy-based materials using photo-cationic polymerization, oxetane-based materials, and acrylic materials using photo-radical polymerization exhibit a phenomenon known as "T-top" in which, when exposed to the above-mentioned broad-spectrum light, a film surface and its surroundings harden preferentially so that the pattern has a wider top portion in cross-section. This "T-top" phenomenon is such that when the sectional configuration of the optical waveguide is observed, a lower portion (on the substrate side) thereof is narrow and an upper portion (on the surface-layer side) is wide. This makes the whole width of the optical waveguide nonuniform to cause a problem such that, when the optical waveguide is inserted into and fixed in the optical waveguide fixing through hole of a ferrule of an optical connector, the positions (optical axes) of the optical waveguide cores are out of the predetermined positions.

For the irradiation with ultraviolet light through a photomask as mentioned above, it is hence preferable to use an exposure filter known as a band-pass filter so as to perform irradiation with only an intended exposure line, depending on the type of photosensitive material, from the viewpoint of resolution of the cladding pattern. It should be noted that some resin materials cause the actual pattern to be thicker or thinner than the design values of the photomask for process-related reasons including volume reduction such as shrinkage on curing, the scattering of the exposure line (ultraviolet light), and the like. To finish to the size in a finally required range, it is desirable to take countermeasures, for example, to multiply the size of the above-mentioned photomask by a correction factor.

Examples of the material for the formation of the cladding layers and the cores for use in the method of manufacturing an optical waveguide for an optical connector include photosensitive resins (photopolymerizable resins) such as epoxy resins, polyimide resins, acrylic resins, methacrylic resins, oxetanes, and silicone resins. Of these resins, cationic polymerizable epoxy resins are preferable from the viewpoints of costs, film thickness controllability, losses and the like.

The above-mentioned photopolymerizable resins together with a photocatalyst such as a photo-acid generator, a photo-base generator, and a photo-radical polymerization initiator constitute a photopolymerizable resin composition. The photopolymerizable resin composition may contain other components including a reactive oligomer, a diluent, and a coupling agent.

Examples of the photo-acid generator include compounds of onium salts, metallocene complexes and the like. Examples of the onium salts include diazonium salts, sulfonium salts, iodonium salts, phosphonium salts, and selenium salts. Examples of counterions of these salts include anions such as $CF_3SO_3^-$, $BF_4^-$, $PF_6^-$, $AsF_6^-$, and $SbF_6^-$. Specific examples include triphenylsulfonium triflate, 4-chlorobenzene diazonium hexafluorophosphate, triphenylsulfonium hexafluoroantimonate, triphenylsulfonium hexafluorophosphate, (4-phenylthio-phenyl)diphenyl sulfonium hexafluoroantimonate, (4-phenylthio-phenyl)diphenyl sulfonium hexafluorophosphate, bis[4-(diphenyl sulfonio)phenyl]sulfide-bis-hexafluoroantimonate, bis [4- (diphenyl sulfonio)phenyl]sulfide-bis-hexafluorophosphate, (4-methoxyphenyl) diphenyl sulfonium hexafluoroantimonate, (4-methoxyphenyl)phenyl iodonium hexafluoroantimonate, bis(4-t-butylphenyl)iodonium hexafluorophosphate, benzyl-triphenylphosphonium hexafluoroantimonate, and triphenylselenium hexafluorophosphate. These compounds are used either singly or in combination.

Examples of the reactive oligomer include fluorene derivative type epoxies, many other epoxies, epoxy(meth)acrylates, urethane acrylates, butadiene acrylates, and oxetanes. In particular, oxetanes are preferable because of their effect of accelerating the hardening of polymerizable mixtures by the addition of only small amounts thereof. Examples of the oxetanes include 3-ethyl-3-hydroxymethyl oxetane, 3-ethyl-3-(phenoxymethyl)oxetane, di(1-ethyl(3-oxetanyl))methyl ether, and 3-ethyl-3-(2-ethylhexylmethyl)oxetane. These reactive oligomers are used either singly or in combination.

Examples of the diluent include alkyl monoglycidyl ethers with a carbon number in the range of 2 to 25, such as butyl glycidyl ether and 2-ethylhexylglycidyl ether, butanediol diglycidyl ether, 1,6-hexanediol diglycidyl ether, neopentyl glycol diglycidyl ether, dodecanediol diglycidyl ether, pentaerythritol polyglycidyl ether, trimethylolpropane polyglycidyl ether, glycerol polyglycidyl ether, phenyl glycidyl ether, resorcinol glycidyl ether, p-tert-butylphenyl glycidyl ether, allyl glycidyl ether, tetrafluoropropyl glycidyl ether, octafluoropropyl glycidyl ether, dodecafluoropentyl glycidyl ether, styrene oxide, 1,7-octadiene diepoxide, limonene diepoxide, limonene monoxide, α-pinene epoxide, β-pinene epoxide, cyclohexene epoxide, cyclooctene epoxide, and vinylcyclohexene oxide.

Examples of the diluent preferable from the viewpoints of heat resistance and transparency include epoxies having an alicyclic structure in the molecules, such as 3,4-epoxycyclohexenylmethyl-3',4'-epoxycyclohexene carboxylate, 3,4-epoxycyclohexenylethyl-8,4-epoxycyclohexene carboxylate, vinylcyclohexene dioxide, allylcyclohexene dioxide, 8,4-epoxy-4-methylcyclohexyl-2-propylene oxide, and bis(3,4-epoxycyclohexyl)ether. Mixing suitable amounts of these diluents with epoxy resins serving as a base compound increases the reaction rate of the epoxy groups to consequently improve the heat resistance of the resultant hardened material and the flexibility thereof as a film.

The coupling agent used herein includes epoxy-based coupling agents. Examples of the epoxy-based coupling agents include 2-(3,4-epoxycyclohexyl)ethyltrimethoxysilane, 3-glycidoxypropyltrimethoxysilane, 3-glycidoxypropyl methyldiethoxysilane, and 3-glycidoxypropyltriethoxysilane. Also, amino-based coupling agents may be used, such as 3-aminopropyltrimethoxysilane, and 3-aminopropyltriethoxysilane.

In consideration of the increase or decrease in size after the forming, it is preferable that the photopolymerizable resin composition serving as the material for the formation of the over cladding layer does not contain a viscosity-adjusting solvent (an organic solvent that does not react with the photosensitive resin serving as a base compound but has only the functions of swelling and plasticizing the resin). For example, when an epoxy resin is used, the use of an epoxy monomer in liquid form in place of the above-mentioned solvent makes the material for the formation of the over cladding layer solvent-free. Examples of the epoxy monomer in liquid form include Celloxide 2021P manufactured by Daicel Chemical Industries, Ltd., Celloxide 2081 manufactured by Daicel Chemical Industries, Ltd., and ADEKA RESIN EP-4080E manufactured by ADEKA Corporation. Using these epoxy monomers in liquid form, the epoxy resins in solid form or in viscous liquid form are dissolved and made solvent-free.

Next, inventive examples will be described in conjunction with comparative examples. It should be noted that the present invention is not limited to the inventive examples.

EXAMPLES

Prior to the examples, materials to be used were prepared.
Material for Formation of Under Cladding Layer and Over Cladding Layer in Inventive Examples 1 and 4

Component A: 100 parts by weight of O-cresol novolac glycidyl ether <YDCN-700-10 manufactured by Tohto Kasei Co., Ltd.>.

Component B: one part by weight of a 50% propione carbonate solution of a triaryl sulfonium salt <CPI-200K manufactured by San-Apro Ltd.> (a photo-acid generator).

A material (a photopolymerizable resin composition) for the formation of cladding was prepared by stirring (at a temperature of 80° C. at 250 rpm for three hours) to dissolve these components in 60 parts by weight of ethyl lactate <manufactured by Musashino Chemical Laboratory, Ltd.>. The viscosity of a prepared varnish was 1800 mPa·s when measured with a digital viscometer <HBDV-I+CP manufactured by Brookfield Engineering Laboratories, Inc.>.
Material for Formation of Under Cladding Layer and Over Cladding Layer in Inventive Examples 2 and 5

Component C: 70 parts by weight of bisphenoxyethanolfluorene diglycidyl ether <OGSOL EG manufactured by Osaka Gas Chemicals Co., Ltd.>.

Component D: 30 parts by weight of 1,1,3-tris[2,5-dimethyl-4-[2-(3-oxetanyl)butoxyphenyl]]-3-phenylpropane <manufactured by Nitto Denko Corporation, with reference to Japanese Published Patent Application No. 2007-191433>.

Component E: one part by weight of a 50% propione carbonate solution of 4,4'-bis[di(β-hydroxyethoxy)phenylsulfinio]phenylsulfide bishexafluoroantimonate (a photo-acid generator).

A material for the formation of cladding was prepared by stirring (at a temperature of 80° C. at 250 rpm for three hours) to dissolve these components in 40 parts by weight of ethyl lactate <manufactured by Wako Pure Chemical Industries, Ltd.>. The viscosity of a prepared varnish was 1300 mPa·s when measured with a digital viscometer <HBDV-I+CP manufactured by Brookfield Engineering Laboratories, Inc.>.
Material for Formation of Under Cladding Layer and Over Cladding Layer in Inventive Examples 3 and 6

Component C: 35 parts by weight of bisphenoxyethanolfluorene diglycidyl ether <OGSOL EG manufactured by Osaka Gas Chemicals Co., Ltd.>.

Component F: 40 parts by weight of 3',4'-epoxycyclohexyl-methyl 3,4-epoxycyclohexanecarboxylate <Celloxide 2021P manufactured by Daicel Chemical Industries, Ltd.>.

Component G: 25 parts by weight of (3',4'-epoxycyclohexane)methyl-3',4'-epoxycyclohexyl carboxylate <Celloxide 2081 manufactured by Daicel Chemical Industries, Ltd.>.

Component H: two parts by weight of a 50% propione carbonate solution of 4,4'-bis[di(β-hydroxyethoxy)phenylsulfinio]phenylsulfide bishexafluoroantimonate (a photo-acid generator).

A material for the formation of the cladding layers was prepared by mixing these components and stirring (at a temperature of 90° C. at 300 rpm for one hour) to dissolve these components. The viscosity of a prepared varnish was 2600 mPa·s when measured with a digital viscometer <HBDV-I+CP manufactured by Brookfield Engineering Laboratories, Inc.>. This material for the formation of the cladding layers (a photopolymerizable resin composition) is of a "solvent-free type" which does not contain a viscosity-adjusting organic solvent (an organic solvent that does not react with a photosensitive resin serving as a base compound but has only the functions of swelling and plasticizing the resin) such as the above-mentioned ethyl lactate.
Material for Formation of Cores in Inventive Examples Component C: 70 parts by weight of bisphenoxyethanolfluorene diglycidyl ether <OGSOL EG manufactured by Osaka Gas Chemicals Co., Ltd.>.

Component I: 30 parts by weight of bisphenolfluorene diglycidyl ether <OGSOL PG manufactured by Osaka Gas Chemicals Co., Ltd.>.

Component H: one part by weight of a 50% propione carbonate solution of 4,4'-bis[di(β-hydroxyethoxy)phenylsulfinio]phenylsulfide bishexafluoroantimonate (a photo-acid generator).

A material (a photopolymerizable resin composition) for the formation of cores was prepared by stirring (at a temperature of 80° C. at 400 rpm for 18 hours) to dissolve these components in 55 parts by weight of cyclohexanone <manufactured by Wako Pure Chemical Industries, Ltd.>. The viscosity of a prepared varnish was 1000 mPa·s when measured with a digital viscometer <HBDV-I+CP manufactured by Brookfield Engineering Laboratories, Inc.>.

Inventive Example 1

Production of Under Cladding Layer

First, the material for the formation of the under cladding layer for Inventive Example 1 described above was applied to a surface of a glass substrate <manufactured by Central Glass Co., Ltd., and measuring 1.1 mm in thickness and 140 mm per side> by a spin coating method using a spin coater <1X-DX2 manufactured by Mikasa Co., Ltd.>. Thereafter, a drying process was performed at 130° C. for 15 minutes. Then, exposure by the use of irradiation with 365-nm light at 4000 mJ/cm² <using an exposure machine (MA-60F manufactured by Mikasa Co., Ltd.) and an ultra-high-pressure mercury-vapor lamp (USH-250D manufactured by Ushio Inc.)> was performed through a quartz photomask M1 having an opening of a rectangular pattern (2.88 mm in width and 102.0 mm in length) corresponding to the under cladding layer, and provided with two spaced openings of a pattern corresponding to ring-shaped alignment marks A (having a diameter of 1 mm and a width of 50 μm) and disposed in a line parallel to the longitudinal direction (the direction of the long side) of the rectangular opening. Subsequently, a heating treatment was performed at 150° C. for 10 minutes. Next, dip development was performed for three minutes using γ-butyrolactone <manufactured by Mitsubishi Chemical Corporation> to dissolve away unexposed portions. Thereafter, a heating treatment was performed at 150° C. for 10 minutes to form the under cladding layer and the two ring-shaped alignment marks A on the substrate. The sectional dimensions of the resultant under cladding layer were 2.90 mm in width and 30 μm in thickness when measured under a digital microscope <VHX-200 manufactured by Keyence Corporation>.

Production of Cores

Next, the material for the formation of the above-mentioned cores was applied to a surface of the above-mentioned under cladding layer by a spin coating method using the spin coater <1X-DX2 manufactured by Mikasa Co., Ltd.>. Thereafter, a drying process was performed at 150° C. for 20 minutes. Then, a quartz photomask M2 having openings of a pattern (including 12 cores each having a length of 101 mm and a width of 40 μm, and disposed at spacings of 210 μm) corresponding to the straight cores parallel to each other in the longitudinal direction, and provided with two spaced openings of a pattern corresponding to cross-shaped alignment marks B (having a length of 1 mm and a width of 50 μm) and disposed in a line parallel to the longitudinal direction of the openings of the core pattern was placed over the above-mentioned under cladding layer. This quartz photomask M2 was positioned so that the pattern corresponding to the above-mentioned cross-shaped alignment marks B fell within the range of the above-mentioned ring-shaped alignment marks A, respectively. Then, exposure by the use of irradiation with 365-nm light at 37000 mJ/cm² <using an exposure machine (MA-60F manufactured by Mikasa Co., Ltd.) and an ultra-high-pressure mercury-vapor lamp (USH-250D manufactured by Ushio Inc.)> was performed from above through the above-mentioned quartz photomask M2. Subsequently, a heating treatment was performed at 100° C. for 60 minutes. Next, dip development was performed for three minutes using γ-butyrolactone <manufactured by Mitsubishi Chemical Corporation> to dissolve away unexposed portions. Thereafter, a heating treatment was performed at 150° C. for 30 minutes to form the multiple cores and the two cross-shaped alignment marks B (within the range of the ring-shaped alignment marks A). The sectional dimensions of the resultant core were 40 μm in width and 40 μm in height when measured under a digital microscope <VHX-200 manufactured by Keyence Corporation>.

Production of Over Cladding Layer

Next, the material for the formation of the over cladding layer for Inventive Example 1 described above was applied over the resultant structure by a spin coating method to cover the cores and also to cover the whole including left-hand and right-hand side portions (crosswise end portions) of the above-mentioned under cladding layer along the length thereof. At this time, the over cladding layer also covered the longitudinal end surfaces of the cores and the under cladding layer. Thereafter, a drying process was performed at 130° C. for 15 minutes.

Then, a quartz photomask M3 was prepared which had an opening of a rectangular pattern (2.98 mm in width and 104.0 mm in length) corresponding to the over cladding layer, and which was provided with two spaced cross-shaped alignment marks C (1 mm per side, and 100 μm in width) disposed in a line parallel to the longitudinal direction (the direction of the long side) of the rectangular opening. This quartz photomask M3 was placed over the substrate. An optical microscope for alignment was used to recognize the positions of the above-mentioned cross-shaped alignment marks B. The alignment marks C provided in the above-mentioned photomask M3 were overlaid on the marks B. Thus, the positioning of the above-mentioned quartz photomask M3 was accurately performed in the horizontal direction.

Thereafter, exposure by the use of irradiation with 365-nm light at 4000 mJ/cm² <using an exposure machine (MA-60F manufactured by Mikasa Co., Ltd.) and an ultra-high-pressure mercury-vapor lamp (USH-250D manufactured by Ushio Inc.)> was performed through the above-mentioned quartz photomask M3. Subsequently, a heating treatment was performed at 150° C. for 10 minutes. Next, dip development was performed for three minutes using γ-butyrolactone <manufactured by Mitsubishi Chemical Corporation> to dissolve away unexposed portions. Thereafter, a heating treatment was performed at 150° C. for 10 minutes to complete the over cladding layer. Thus, a strip-shaped optical waveguide was provided. The sectional dimensions of the entire optical waveguide including the above-mentioned over cladding layer were 3.0 mm in width and 100 μm in thickness when measured under a digital microscope <VHX-200 manufactured by Keyence Corporation>.

End Surface Machining of Optical Waveguide

The optical waveguide produced as mentioned above was stripped from the glass substrate, and the optical waveguide brought into the form of a film was affixed to a dicing tape (UE-111AJ manufactured by Nitto Denko Corporation). The over cladding layer near the longitudinal ends thereof, together with the cores and the under cladding layer, was cut by dicing <using a dicing device (DAD522 manufactured by Disco Corporation) and a dicing blade manufactured by Disco Corporation (NBC-Z2050 having dimensions of 50.6× 0.025×40 mm and a cutting speed of 0.3 mm per second)>, so that the length (the whole length) of the optical waveguide was adjusted to 100 mm and so that the longitudinal end surfaces (the optical connection surfaces) of the cores were uncovered. In this manner, the optical waveguide for an optical connector was provided in Inventive Example 1.

Inventive Example 2

Production of Under Cladding Layer

First, the material for the formation of the under cladding layer for Inventive Example 2 described above was applied to a surface of a glass substrate <manufactured by Central Glass Co., Ltd., and measuring 1.1 mm in thickness and 140 mm per side> by a spin coating method using a spin coater <1X-DX2 manufactured by Mikasa Co., Ltd.>. Thereafter, a drying process was performed at 130° C. for 15 minutes. Then, exposure by the use of irradiation with 365-nm light at 4000 mJ/cm² <using an exposure machine (MA-60F manufactured by Mikasa Co., Ltd.) and an ultra-high-pressure mercury-vapor lamp (USH-250D manufactured by Ushio Inc.)> was performed through the quartz photomask M1 having an opening of a rectangular pattern (2.90 mm in width and 102.0 mm in length) corresponding to the under cladding layer, and provided with two spaced openings of a pattern corresponding to the ring-shaped alignment marks A (having a diameter of 1 mm and a width of 50 μm) and disposed in a line parallel to the longitudinal direction (the direction of the long side) of the rectangular opening. Subsequently, a heating treatment was performed at 100° C. for 15 minutes. Next, dip development was performed for three minutes using γ-butyrolactone <manufactured by Mitsubishi Chemical Corporation> to dissolve away unexposed portions. Thereafter, a heating treatment was performed at 150° C. for 15 minutes to form the under cladding layer and the two ring-shaped alignment marks A on the substrate. The sectional dimensions of the resultant under cladding layer were 2.90 mm in width and 30 μm in thickness when measured under a digital microscope <VHX-200 manufactured by Keyence Corporation>.

Production of Cores

Next, a process similar to that in Inventive Example 1 described above was performed to form the multiple cores and the two cross-shaped alignment marks B on the surface of the above-mentioned under cladding layer.

Production of Over Cladding Layer

Next, the material for the formation of the over cladding layer for Inventive Example 2 described above was applied over the resultant structure by a spin coating method to cover the cores and also to cover the whole including left-hand and right-hand side portions (crosswise end portions) of the above-mentioned under cladding layer along the length thereof. At this time, the over cladding layer also covered the longitudinal end surfaces of the cores and the under cladding layer. Thereafter, a drying process was performed at 130° C. for 15 minutes.

Then, the quartz photomask M3 was prepared which had an opening of a rectangular pattern (3.00 mm in width and 104.0 mm in length) corresponding to the over cladding layer, and which was provided with the two spaced cross-shaped alignment marks C (1 mm per side, and 100 µm in width) disposed in a line parallel to the longitudinal direction (the direction of the long side) of the rectangular opening. This quartz photomask M3 was placed over the substrate. An optical microscope for alignment was used to recognize the positions of the above-mentioned cross-shaped alignment marks B. The alignment marks C provided in the above-mentioned photomask M3 were overlaid on the marks B. Thus, the positioning of the above-mentioned quartz photomask M3 was accurately performed in the horizontal direction.

Thereafter, exposure by the use of irradiation with 365-nm light at 4000 mJ/cm$^2$ <using an exposure machine (MA-60F manufactured by Mikasa Co., Ltd.) and an ultra-high-pressure mercury-vapor lamp (USH-250D manufactured by Ushio Inc.)> was performed through the above-mentioned photomask M3. Subsequently, a heating treatment was performed at 100° C. for 15 minutes. Next, dip development was performed for three minutes using γ-butyrolactone <manufactured by Mitsubishi Chemical Corporation> to dissolve away unexposed portions. Thereafter, a heating treatment was performed at 150° C. for 15 minutes to complete the over cladding layer. Thus, a strip-shaped optical waveguide was provided. The sectional dimensions of the entire optical waveguide including the above-mentioned over cladding layer were 3.0 mm in width and 100 µm in thickness when measured under a digital microscope <VHX-200 manufactured by Keyence Corporation>.

End Surface Machining of Optical Waveguide

A process similar to that in Inventive Example 1 described above was performed to strip the optical waveguide produced as mentioned above from the glass substrate, and to cut the optical waveguide together with the cores and the under cladding layer by dicing, so that the length (the whole length) of the optical waveguide was adjusted to 100 mm and so that the longitudinal end surfaces (the optical connection surfaces) of the cores were uncovered. In this manner, the optical waveguide for an optical connector was provided in Inventive Example 2.

Inventive Example 3

Production of Under Cladding Layer

First, the material for the formation of the under cladding layer for Inventive Example 3 described above was applied to a surface of a glass substrate <manufactured by Central Glass Co., Ltd., and measuring 1.1 mm in thickness and 140 mm per side> by a spin coating method using a spin coater <1X-DX2 manufactured by Mikasa Co., Ltd.>. Then, exposure by the use of irradiation with 365-nm light at 4000 mJ/cm$^2$ <using an exposure machine (MA-60F manufactured by Mikasa Co., Ltd.) and an ultra-high-pressure mercury-vapor lamp (USH-250D manufactured by Ushio Inc.)> was performed through the quartz photomask M1 having an opening of a rectangular pattern (2.885 mm in width and 102.0 mm in length) corresponding to the under cladding layer, and provided with two spaced openings of a pattern corresponding to the ring-shaped alignment marks A (having a diameter of 1 mm and a width of 50 µm) and disposed in a line parallel to the longitudinal direction (the direction of the long side) of the rectangular opening. Subsequently, a heating treatment was performed at 70° C. for 15 minutes. Next, dip development was performed for three minutes using γ-butyrolactone <manufactured by Mitsubishi Chemical Corporation> to dissolve away unexposed portions. Thereafter, a heating treatment was performed at 150° C. for 15 minutes to form the under cladding layer and the two ring-shaped alignment marks A on the substrate. The sectional dimensions of the resultant under cladding layer were 2.90 mm in width and 30 µm in thickness when measured under a digital microscope <VHX-200 manufactured by Keyence Corporation>.

Production of Cores

Next, a process similar to that in Inventive Example 1 described above was performed to form the multiple cores and the two cross-shaped alignment marks B on the surface of the above-mentioned under cladding layer.

Production of Over Cladding Layer

Next, the material for the formation of the over cladding layer for Inventive Example 3 described above was applied over the resultant structure by a spin coating method to cover the cores and also to cover the whole including left-hand and right-hand side portions (crosswise end portions) of the above-mentioned under cladding layer along the length thereof. At this time, the over cladding layer also covered the longitudinal end surfaces of the cores and the under cladding layer.

Then, the quartz photomask M3 was prepared which had an opening of a rectangular pattern (2.985 mm in width and 103.0 mm in length) corresponding to the over cladding layer, and which was provided with the two spaced cross-shaped alignment marks C (1 mm per side, and 100 µm in width) disposed in a line parallel to the longitudinal direction (the direction of the long side) of the rectangular opening. This quartz photomask M3 was placed over the substrate. An optical microscope for alignment was used to recognize the positions of the above-mentioned cross-shaped alignment marks B. The alignment marks C provided in the above-mentioned photomask M3 were overlaid on the marks B. Thus, the positioning of the above-mentioned quartz photomask M3 was accurately performed in the horizontal direction.

Thereafter, exposure by the use of irradiation with 365-nm light at 4000 mJ/cm$^2$ <using an exposure machine (MA-60F manufactured by Mikasa Co., Ltd.) and an ultra-high-pressure mercury-vapor lamp (USH-250D manufactured by Ushio Inc.)> was performed through the above-mentioned photomask M3. Subsequently, a heating treatment was performed at 70° C. for 15 minutes. Next, dip development was performed for three minutes using γ-butyrolactone <manufactured by Mitsubishi Chemical Corporation> to dissolve away unexposed portions. Thereafter, a heating treatment was performed at 150° C. for 15 minutes to complete the over cladding layer. Thus, a strip-shaped optical waveguide was provided. The sectional dimensions of the entire optical waveguide including the above-mentioned over cladding layer were 3.0 mm in width and 100 µm in thickness when measured under a digital microscope <VHX-200 manufactured by Keyence Corporation>.

End Surface Machining of Optical Waveguide

A process similar to that in Inventive Example 1 described above was performed to strip the optical waveguide produced as mentioned above from the glass substrate, and to cut the optical waveguide together with the cores and the under cladding layer by dicing, so that the length (the whole length) of the optical waveguide was adjusted to 100 mm and so that the longitudinal end surfaces (the optical connection surfaces) of the cores were uncovered. In this manner, the optical waveguide for an optical connector was provided in Inventive Example 3.

Inventive Example 4

Production of Under Cladding Layer and Cores

A process similar to that in Inventive Example 1 described above was performed to form the under cladding layer on the substrate, and to form the multiple cores on the under cladding layer.

Production of Over Cladding Layer

Next, using the quartz photomask M3 having the same pattern as that in Inventive Example 1 described above and utilizing the positions of the opposite ends of the core pattern, a process similar to that in Inventive Example 1 described above was performed except that this photomask was positioned, to complete the over cladding layer. Thus, a strip-shaped optical waveguide was provided.

End Surface Machining of Optical Waveguide

Next, a process similar to that in Inventive Example 1 described above was performed to adjust the length (the whole length) of the optical waveguide to 100 mm and to uncover the longitudinal end surfaces (the optical connection surfaces) of the cores. In this manner, the optical waveguide for an optical connector was provided in Inventive Example 4.

Inventive Example 5

Production of Under Cladding Layer and Cores

A process similar to that in Inventive Example 2 described above was performed to form the under cladding layer on the substrate, and to form the multiple cores on the under cladding layer.

Production of Over Cladding Layer

Next, using the quartz photomask M3 having the same pattern as that in Inventive Example 2 described above and utilizing the positions of the opposite ends of the core pattern, a process similar to that in Inventive Example 2 described above was performed except that this photomask was positioned, to complete the over cladding layer. Thus, a strip-shaped optical waveguide was provided.

End Surface Machining of Optical Waveguide

Next, a process similar to that in Inventive Example 2 described above was performed to adjust the length (the whole length) of the optical waveguide to 100 mm and to uncover the longitudinal end surfaces (the optical connection surfaces) of the cores. In this manner, the optical waveguide for an optical connector was provided in Inventive Example 5.

Inventive Example 6

Production of Under Cladding Layer and Cores

A process similar to that in Inventive Example 3 described above was performed to form the under cladding layer on the substrate, and to form the multiple cores on the under cladding layer.

Production of Over Cladding Layer

Next, using the quartz photomask M3 having the same pattern as that in Inventive Example 3 described above and utilizing the positions of the opposite ends of the core pattern, a process similar to that in Inventive Example 3 described above was performed except that this photomask was positioned, to complete the over cladding layer. Thus, a strip-shaped optical waveguide was provided.

End Surface Machining of Optical Waveguide

Next, a process similar to that in Inventive Example 3 described above was performed to adjust the length (the whole length) of the optical waveguide to 100 mm and to uncover the longitudinal end surfaces (the optical connection surfaces) of the cores. In this manner, the optical waveguide for an optical connector was provided in Inventive Example 6.

Comparative Example 1

Production of Under Cladding Layer

A process similar to that in Inventive Example 1 was performed except that the entire surface of an under cladding layer was exposed to light without using a photomask, to form the under cladding layer.

Production of Cores

A process similar to that in Inventive Example 1 was performed to form cores (without an alignment operation).

Production of Over Cladding Layer

A process similar to that in Inventive Example 1 was performed except that the entire surface of an over cladding layer was exposed to light without using a photomask, to form the over cladding layer, thereby providing an optical waveguide film (without an alignment operation).

Width Machining and End Surface Machining of Optical Waveguide

Next, the dicing device, dicing blade and tape used in Inventive Example 1 were used to cut the above-mentioned optical waveguide film at a speed of 1.0 mm per second along the optical axes of the cores (in the longitudinal direction of an optical waveguide) so as to provide 12 cores and the whole width (3.0 mm) of the optical waveguide, thereby providing a strip-shaped optical waveguide. Also, the over cladding layer near the longitudinal ends thereof, together with the cores and the under cladding layer, was cut at a speed of 0.3 mm per second by the above-mentioned dicing, so that the length (the whole length) of the optical waveguide was adjusted to 100 mm and so that the longitudinal end surfaces (the optical connection surfaces) of the cores were uncovered. In this manner, the optical waveguide for an optical connector was provided in Comparative Example 1.

Comparative Example 2

Production of Optical Waveguide Film

A process similar to that in Comparative Example 1 described above was performed to provide an optical waveguide film.

Width Machining and End Surface Machining of Optical Waveguide

Next, the optical waveguide film produced as mentioned above was stripped from the glass substrate. An excimer laser machining device manufactured by Exitech Corporation (under the product designation M8000, and having a wavelength of 248 nm, an average power of 50 W, a pulse width of 20 ns, and a frequency of 100 Hz) was used to cut the optical waveguide film along the optical axes of the cores (in the longitudinal direction of an optical waveguide) in a manner similar to that in Comparative Example 1 so that the whole width of the optical waveguide including the 12 cores was 3.0 mm. Thus, a strip-shaped optical waveguide was provided. Then, the longitudinal end portions of this optical waveguide, together with the cores and the cladding layers, were cut by dicing in a manner similar to that in Comparative Example 1, so that the length (the whole length) of the optical waveguide was adjusted to 100 mm and so that the longitudinal end surfaces (the optical connection surfaces) of the cores were uncovered. In this manner, the optical waveguide for an optical connector was provided in Comparative Example 2.

Production of Optical Connector

Each of the optical waveguides for an optical connector in Inventive Examples 1 to 6 and Comparative Examples 1 and 2 which were provided in the above-mentioned manner was used to insert an end portion (a longitudinal end portion) thereof into a boot of a PMT ferrule in accordance with JPCA Standards. The above-mentioned optical waveguide was fixed to the ferrule, with the distal end (the optical connection surface) of a coupling end portion of the optical waveguide positioned in an optical waveguide exit opening in an end surface of the above-mentioned ferrule and exposed to the outside. In this manner, optical connectors for Inventive Examples 1 to 6 and Comparative Examples 1 and 2 were produced.

Dimensional Accuracy of Optical Waveguide

The positional accuracy of the outermost cores along the width thereof in a bundle of 12 cores and the widthwise end portions (side surfaces) of the optical waveguide relative to each other was measured by observing the optical connection surfaces of 20 optical waveguides in each of Inventive Examples 1 to 6 and Comparative Examples 1 and 2 provided above by using a digital microscope (VHX-200) manufactured by Keyence Corporation. The results of the measurement were listed in Table 1.

TABLE 1

| | Positional Accuracy of Cores and Widthwise End Portions (Side Surfaces) of Optical Waveguide Relative to Each Other | The Number of Connectors with Coupling Loss Exceeding 1.5 dB out of 20 Optical Connectors | Remarks |
| --- | --- | --- | --- |
| Inv. Ex. 1 | ±6 μm | 0 | |
| Inv. Ex. 2 | ±6 μm | 0 | |
| Inv. Ex. 3 | ±6 μm | 0 | |
| Inv. Ex. 4 | ±6 μm | 0 | |
| Inv. Ex. 5 | ±6 μm | 0 | |
| Inv. Ex. 6 | ±6 μm | 0 | |
| Comp. Ex. 1 | ±12 μm | 3 | |
| Comp. Ex. 2 | ±6 μm | 0 | Propagation Loss of Optical Waveguide Became Worse. |

Table 1 described above showed that all of the optical waveguides in Inventive Examples 1 to 6 were better in dimensional accuracy than the optical waveguide in Comparative Example 1. Comparative Example 2 was approximately the same in dimensional accuracy as Inventive Examples 1 to 6.

Performance Test on Optical Connector

The optical coupling losses (connection losses) of the optical connectors in Inventive Examples 1 to 6 and Comparative Examples 1 and 2 obtained above were measured in accordance with JPCA-PE03-01-07S.

As a result, all of the optical connectors using the optical waveguides in Inventive Examples 1 to 6 had coupling losses less than 1.5 dB, which fell within the standards defined by JPCA-PE03-01-07S. Also, all of the optical connectors using the optical waveguides in Comparative Example 2 had coupling losses less than 1.5 dB, but there were three optical connectors using the optical waveguides in Comparative Example 1 which had connection losses exceeding 1.5 dB.

In this manner, Inventive Examples 1 to 6 and Comparative Example 2 showed that all of the optical connectors produced therein fell within the standards. However, Comparative Example 2 showed that two out of 12 cores on each side, i.e. a total of four cores on both sides, had propagation losses at least 3.0 dB greater than those of the remaining cores. This is considered to result from the fact that machined portions and their surrounding portions are thermally damaged by high-power laser machining. The effect of such thermal damages is also found from the fact that the machined portions and their surrounding portions have a visible color change. In this manner, Comparative Example 2 has a problem in that the laser-machined portions and their surrounding portions cannot be used as an optical waveguide.

Comparative Example 1, on the other hand, has a problem in degree of machining flexibility because dicing is capable of linear machining but is not capable of machining curved portions. Also, Comparative Example 2 is capable of machining to any shape such as a curved line, but is low in cutting speed and requires the process of cleaning residues at the cut surface after the cutting. Additionally, Comparative Example 2 is poor in mass productivity because of the high running costs of the device itself.

In comparison with Comparative Examples 1 and 2, Inventive Examples 1 to 6 may eliminate the widthwise cutting process step to present no problems in cutting speed and running costs, thereby offering advantages in mass productivity.

The optical waveguide for an optical connector and an optical connector using the same are low in optical coupling loss and suitable for optical interconnection for connection between boards in an electronic device and between chips on a board. The method of manufacturing an optical waveguide for an optical connector is capable of manufacturing optical waveguides with low coupling losses efficiently at low costs.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical waveguide for an optical connector, comprising:
    cores for transmitting light;
    an under cladding layer provided under the cores; and
    an over cladding layer provided over the cores,
    wherein the optical waveguide has a longitudinal end portion configured to be inserted and fixed in a predetermined through hole provided in a ferrule for connection to another optical connector,
    wherein said under cladding layer has a width less than the width of said through hole,
    wherein each of said cores is in the form of a ridge continuing in the longitudinal direction and including a photolithographic member made of a photosensitive resin, and
    wherein said over cladding layer includes a photolithographic member made of a photosensitive resin and provided with respect to the positions of said cores or positioning alignment marks, said over cladding layer covering said cores and said under cladding layer including widthwise end surfaces thereof, no clearance is created between the widthwise end surfaces of said over cladding layer and side surfaces of said through hole when said optical waveguide is fitted into said through hole of said ferrule.

2. An optical connector, comprising:

an optical waveguide; and a ferrule having an alignment structure and provided with a predetermined through hole, wherein said optical waveguide includes cores for transmitting light, an under cladding layer provided under the cores, and an over cladding layer provided over the cores, the optical waveguide having a longitudinal end portion configured to be inserted and fixed in the through hole provided in the ferrule for connection to another optical connector, said under cladding layer having a width less than the width of said through hole, each of said cores being in the form of a ridge continuing in the longitudinal direction and including a photolithographic member made of a photosensitive resin, said over cladding layer including a photolithographic member made of a photosensitive resin and provided with respect to the positions of said cores or positioning alignment marks, said over cladding layer covering said cores and said under cladding layer including widthwise end surfaces thereof, wherein said optical waveguide has at least one end portion inserted and fixed in a first insertion opening of said through hole provided in said ferrule, wherein the at least one end portion of said optical waveguide has a longitudinal distal end surface revealed from a second exit opening of said through hole, and wherein while each of said cores has a longitudinal end portion positioned in place, the whole width of said optical waveguide formed with the widthwise end portions of said over cladding layer and the whole width of said through hole coincide with each other.

* * * * *